United States Patent [19]

Munakata et al.

[11] 4,184,115

[45] Jan. 15, 1980

[54] MOBILE CITIZEN BAND TRANSCEIVER CONTROL UNIT WITH AN AUDIO FREQUENCY APPARATUS

[75] Inventors: Daisaburo Munakata; Motomasa Yoshida, both of Toda, Japan

[73] Assignee: Clarion Company Limited, Japan

[21] Appl. No.: 781,479

[22] Filed: Mar. 25, 1977

[30] Foreign Application Priority Data

Mar. 26, 1976 [JP] Japan ............................. 51-35843

[51] Int. Cl.² .............................................. H04B 1/40
[52] U.S. Cl. ..................................... 325/25; 325/111; 325/312
[58] Field of Search ..................... 325/15, 18, 20, 21, 325/25, 312, 314, 111

[56] References Cited

U.S. PATENT DOCUMENTS

| | | | |
|---|---|---|---|
| 1,942,594 | 1/1934 | Edwards | 325/312 |
| 1,997,254 | 4/1935 | Forsythe | 325/312 |
| 3,219,931 | 11/1965 | Lennon et al. | 325/18 |
| 3,277,374 | 10/1966 | Kobayashi | 325/18 |
| 3,613,003 | 10/1971 | Kubo | 325/18 |
| 3,947,766 | 3/1976 | Kawasaki | 325/25 |
| 4,032,844 | 6/1977 | Imazeki | 325/25 |

OTHER PUBLICATIONS

"Royce Three-Piece CB Transceiver" Popular Electronics p. 14, May, 1976.
Best Products Buyer's Book #119 (Effective Sep. 1975) p. 317, "J.I.L. 23 Channel Mobile CB Transceiver with AM/FM and 8-Track Stereo Tape Player".

*Primary Examiner*—Robert L. Griffin
*Assistant Examiner*—Michael A. Masinick
*Attorney, Agent, or Firm*—Robert E. Burns; Emmanuel J. Lobato; Bruce L. Adams

[57] ABSTRACT

A mobile citizen band transceiver (hereinafter referred to as CB transceiver) control unit with an audio frequency apparatus includes a radio receiver, an instrument panel at which the radio receiver is installed in an in-dash mounting, a channel selecting knob for the CB transceiver, a channel indicating member, a CB transceiver unit including electrical circuits for receiving or transmitting CB signals, except at least the channel selecting knob and the channel indicating member, and a connection cable for connecting the channel selecting knob and channel indicating member to the CB transceiver unit. The channel selecting knob and the channel indicating member are built into the radio receiver, or alternatively located adjacent to the radio receiver. The transceiver unit is installed at any desired location other than the instrument panel.

3 Claims, 20 Drawing Figures

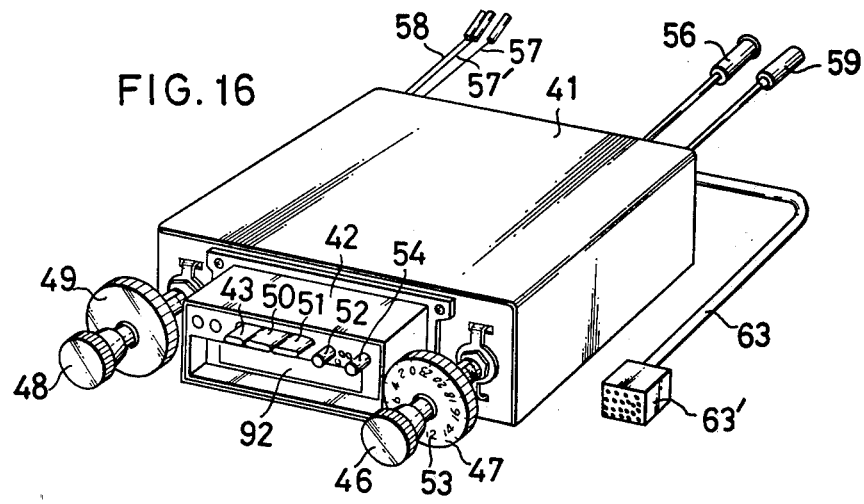
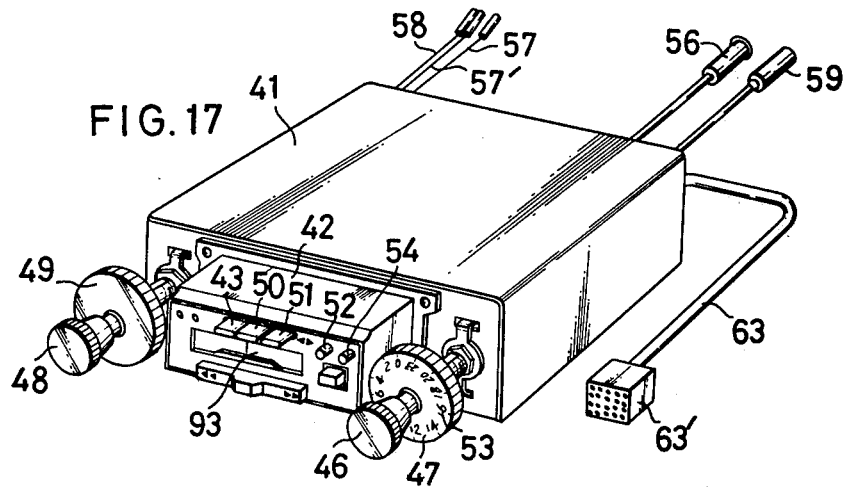
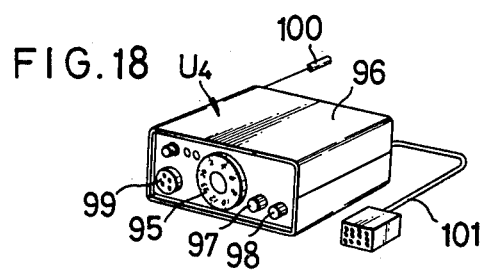

ns to a mobile citizen band transceiver (hereinafter referred to as CB transceiver) control unit with an audio frequency apparatus such as a radio receiver, and more particularly to a mobile CB transceiver control unit with an audio frequency apparatus which can be easily and surely operated by an automobile operator.

MOBILE CITIZEN BAND TRANSCEIVER CONTROL UNIT WITH AN AUDIO FREQUENCY APPARATUS

BACKGROUND OF THE INVENTION

1. Field of the Invention

This invention relates to a mobile citizen band transceiver (hereinafter referred to as CB transceiver) control unit with an audio frequency apparatus such as a radio receiver, and more particularly to a mobile CB transceiver control unit with an audio frequency apparatus which can be easily and surely operated by an automobile operator.

2. Prior Art

There has hitherto been proposed use of a mobile amplitude modulated (hereinafter referred to as AM) band and/or frequency modulated (hereinafter referred to as FM) band radio receiver as a mobile audio frequency apparatus. The channel is selected by push buttons, or by manual or automatic tuning. Some mobile radio receivers are equipped with a tape cartridge player/recorder in which audio information can be reproduced from or recorded on a magnetic tape.

FIG. 1 shows one example of a conventional mobile radio receiver. It is an AM/FM multiplex five push button type radio receiver. A housing 1 contains a tuning circuit for channel selection, an AM/FM detecting circuit, a low frequency amplifier and so on. An AM/FM change-over slide switch 3, channel selecting push buttons 4 and a dial plate 5 are arranged in a nose escutcheon 2. At the right side of the nose escutcheon 2, a tuning knob 6 and a stereo control knob 7 are arranged concentrically with each other. And at the left side of the nose escutcheon 2, a power switch-volume control knob 8 and a tone control knob 9 are arranged similarly concentrically with each other. An antenna lead socket 10, speaker connection leads 11 and 11', and a power supply lead 12 are connected to the back side of the housing 1.

FIG. 2 to FIG. 4 show the manner in which the radio receiver RX as above described is mounted in an automobile. The manner is called "In-dash type of mounting". FIG. 2 is a forward view from the rear seat. And FIG. 3 is a cross-sectional view of a part of the autombile.

As shown in FIG. 4, a rectangular opening 16 and round openings 17 and 18 are made in an instrument panel 15 for receiving the nose escutcheon 2 and the shafts of the tuning knob 6, the stereo control knob 7, the power switch-volume control knob 8 and the tone control knob 9, respectively. As shown by FIG. 3, the radio receiver RX is fitted to the instrument panel 15. In the in-dash type of mounting, only actuating members such as the knobs and indicating members such as the dial plate 5 appear at the front of the instrument panel 15 in the radio receiver RX. Some vehicle instruments 19, 19' and 19" are also fitted to the instrument panel 15. Such in-dash type of mounting has the advantage that the driver can easily operate the radio receiver RX. Moreover, a storage section 20 is arranged in the instrument panel 15. An engine compartment 22 is separated from a driver compartment 23 by a partitioning wall 21.

FIG. 5 and FIG. 6 show the other manner in which the radio receiver RX is mounted in the automobile. The manner is called "Under-dash type of mounting". In FIG. 5 and FIG. 6, the parts which correspond to the same parts in FIG. 2 and FIG. 3 are denoted by the same reference numerals.

The openings for fitting the radio receiver RX are not made in the instrument panel 15, in the under-dash type of mounting. The radio receiver RX is fixed by metallic members 25 and 26 under the instrument panel 15, as shown by FIG. 6. The radio receiver RX is hung from the instrument panel 15. Such under-dash type of mounting has the disadvantage that the operator has difficulty operating the radio receiver RX since it is somewhat remote from the operator and that the radio receiver RX is apt to be struck by the knee of the operator or any vehicle passenger.

Recently, it has become popular to mount a CB transceiver together with the above described radio receiver in automobiles. By the CB transceiver, audio signals are transmitted and received between the driver and any other person having a CB radio. Mainly, an AM modulating method or SSB (single side band) modulation method is employed for the CB transceiver. And the frequency band of about 27 MHZ is employed for the CB transceiver. No special license is required for the operation of the CB transceiver. Accordingly, the CB transceivers are widely used between general citizens.

FIG. 7 shows one example of a CB transceiver which is not for an automobile, but for general use. A housing 28 is substantially as large as the housing of the radio receiver, and it contains a high frequency amplifier for transmitting and receiving CB signals, a channel selecting circuit, a modulating circuit, a power amplifier and so on. A channel selecting knob 30, a channel indicator 31, a fine tuning knob 32, an illuminating lamp 33, a level meter 34, a volume control knob 35, a power switch 36 and a microphone socket 37 are arranged in a front panel 29 of the housing 28. And an antenna lead socket 38 is arranged in a side panel of the housing 28.

When the CB transceiver as above described will be mounted in the autombile provided with the radio receiver, it is necessarily mounted under the instrument panel 15, namely in the under-dash mounting manner. Because the instrument panel 15 is limited in surface area, and different leads and pipes are arranged behind the instrument panel 15, both the radio receiver and the CB transceiver cannot be together assembled into the instrument panel 15. A housing which contains electrical circuits such as amplifiers both for the radio receiver and the CB transceiver, is so large-sized that the housing cannot be fitted to the instrument panel 15 in the in-dash mounting manner.

However, when the CB transceiver is mounted in the under-dash mounting manner, in the automobile, it is difficult for the operator to operate the CB transceiver, since it is far from the operator, and since the number of the channels in the citizen band is as large as 40. The operator is apt to misoperate the channel selector. Moreover, there is a serious problem with regard to the safety of the operator driving the vehicle while operating the CB transceiver. The CB transceiver is apt to be struck by the knee of the operator or any other vehile passenger. Since the CB transceiver mounted in the under-dash mounting manner can be easily dismounted from the automobile, it is easy to be stolen.

SUMMARY OF THE INVENTION

Accordingly, an object of this invention is to provide a mobile CB transceiver control unit with an audio frequency apparatus which overcomes the above described disadvantages of the conventional mobile CB transceiver with an audio frequency apparatus.

Another object of this invention is to provide a mobile CB transceiver control unit with an audio frequency apparatus which can be easily and accurately operated without reducing the safety of the operator.

A further object of this invention is to provide a mobile CB transceiver control unit with an audio frequency apparatus for which there is little possibility that the CB transceiver unit can be stolen.

A still further object of this invention is to provide a mobile CB transceiver control unit with an audio frequency apparatus in which the CB transceiver control unit and the audio frequency apparatus can be arranged separately from each other.

In accordance with one aspect of this invention, a mobile CB transceiver control unit with an audio frequency apparatus or stage includes an audio frequency apparatus having a low frequency amplifier, an instrument panel, said audio frequency apparatus being installed at said instrument panel in the in-dash mounting manner, a channel selecting means for the CB transceiver, a channel indicating means for the CB transceiver, the channel selecting means being assembled into the audio frequency apparatus, or arranged adjacent to the audio frequency apparatus, a CB transceiver unit including electrical parts and circuits for receiving or transmitting CB signals, except at least the channel selecting means and channel indicating means, and being installed at any desired location other than the instrument panel, and a connection cable for connecting the channel selecting means and the channel indicating means to the CB transceiver unit.

The other objects, features and advantages of this invention will be apparent from the following description taken in conjunction with the accompanying drawings.

BRIEF DESCRIPTION OF THE DRAWINGS

FIG. 16 is a perspective view of a CB transceiver control unit with a radio receiver according to another embodiment of this invention;

FIG. 17 is a perspective view of a CB transceiver control unit with a radio receiver according to a third embodiment of this invention; and FIG. 18 is a perspective view of a CB transceiver control unit according to a fourth embodiment of this invention.

DESCRIPTION OF THE PREFERRED EMBODIMENTS

One embodiment of this invention will be described with reference to FIG. 8 to FIG. 15. In this embodiment, a channel indicating member of a CB transceiver and a channel selecting member thereof are assembled into a radio receiver which is substantially the same as any conventional AM/FM muliplex five push-button radio receiver.

Figure 8:
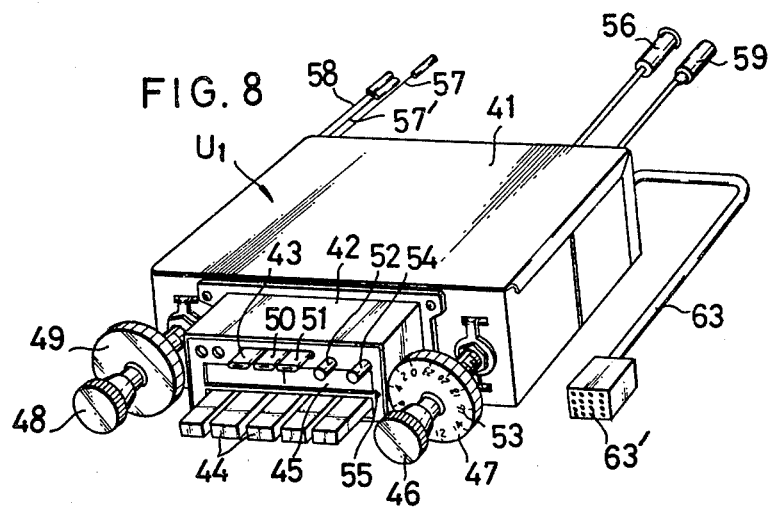
FIG. 8 is a perspective view of a CB transceiver control unit according to the present invention with a radio receiver.

Referring to FIG. 8, a housing 41 is for example, about 60mm high, about 180mm wide and about 140mm long. Such a size is suitable for the in-dash type of mounting. An AM/FM change-over push button 43, channel selecting push buttons 44 and a dial plate 45 are arranged for a radio receiver in a nose escutcheon 2. In addition to the parts for the radio receiver, a stand-by push button 50, a CB transceiver change-over push button 51 and a squelch control push button 52 are arranged for a CB transceiver in the nose escutcheon.

When the stand-by push button 50 is depressed, as described hereafter, CB signals can be automatically received, even when the radio signals are being received.

With the application of the CB signals to the antenna, the CB transceiver with the radio receiver is automatically changed over into the CB signal receiving condition from the radio signal receiving condition. The CB transceiver change-over push button 51 works to operate alternatively the CB transceiver.

At the side of the nose escutcheon 42, a tuning knob 46 for the radio receiver and a channel selecting knob 47 for the CB transceiver are arranged concentrically with each other. The channel selecting knob 47 may be combined with a multi-stage rotary switch arranged in the housing 41. For the selective transmission and receipt of the CB signals, a carrier oscillator of a transmitting section, a tuning circuit of a receiving section and a local oscillator thereof are controlled with the channel selecting knob 47, in a CB transceiver unit to be described hereafter. The channel selecting knob 47 may be combined with an electric means such as a signal converting circuit as described hereafter.

The CB transceiver control unit with the radio receiver $U_1$ of FIG. 8 contains a part of the CB transceiver and all circuits for the radio receiver, such as a tuning circuit, an AM/FM detecting circuit and a low frequency amplifier. FIG. 53 marked on the surface of the channel selecting knob 47 represent a channel indicating member. A pointer 55 for the channel indicating member is provided in the nose escutcheon 42. Moreover, an illuminating member 54 is provided for the indicating member 53 and the pointer 55, in the nose escutcheon 42.

Figure 9:
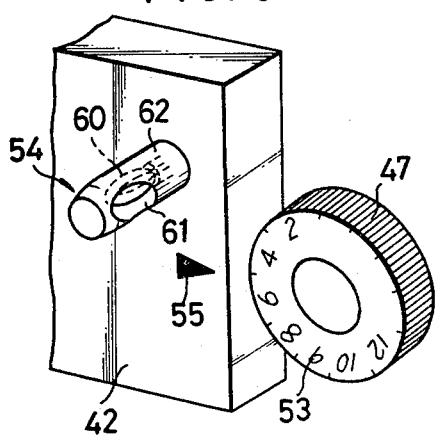
FIG. 9 is an enlarged perspective view of an illuminating member used in the CB transceiver control unit of FIG. 8.
Figure 10:
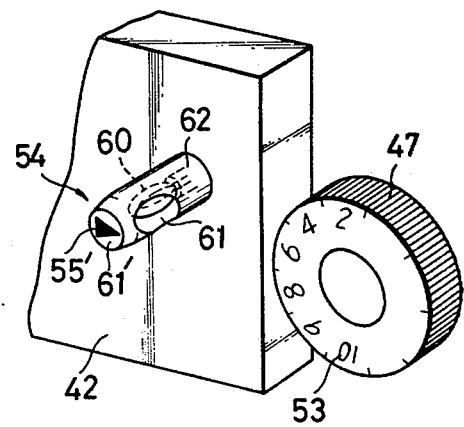
FIG. 10 is an enlarged perspective view of one modification of the illuminating member of FIG. 9.

FIG. 9 shows the details of the illuminating member 54. In the illuminating member 54, a lamp 60 is fixed to the nose escutcheon 42, and covered with a light shielding cover 62 having a transparent portion 61. The light from the lamp 60 is irradiated through the transparent portion 61 onto the pointer 55 and the channel indicating member 53. FIG. 10 shows one modification of the illuminating member 54. In this modification, another transparent portion 61' is formed in the light shielding cover 62. The pointer 55 is marked on the transparent portion 61'.

Since the lamp 60 is covered with the light shielding cover 62, only parts necessary for selecting and indicating the channel are illuminated. That is advantageous in increasing the safety of operating the CB transceiver while driving.

Figure 1:
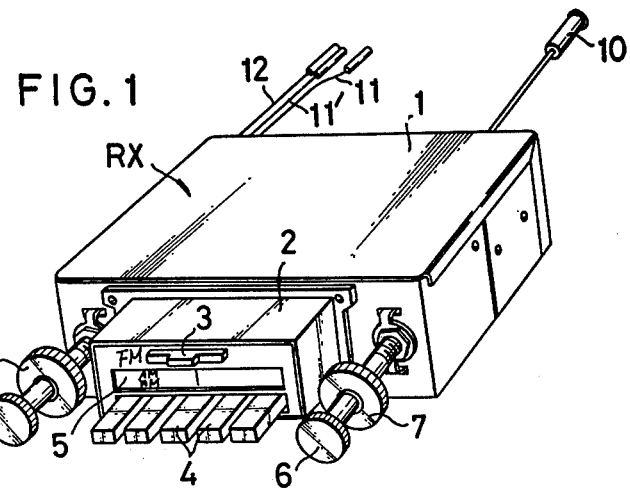
FIG. 1 is a perspective view of a conventional mobile radio receiver.
Figure 2:
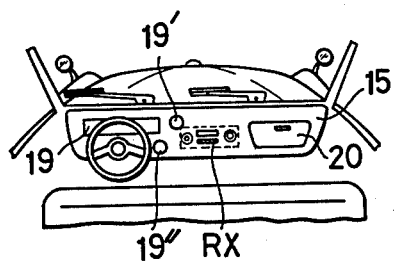
FIG. 2 is a front view showing the radio receiver of FIG. 1 mounted at the instrument panel in the in-dash mounting manner.
Figure 3:
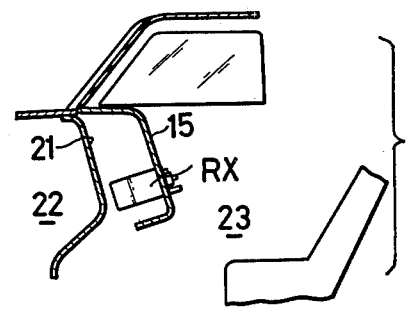
FIG. 3 is a cross-sectional view showing the arrangement similar to FIG. 2.
Figure 4:
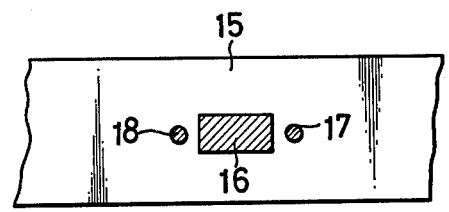
FIG. 4 is an enlarged front view of a part of the instrument panel.
Figure 5:
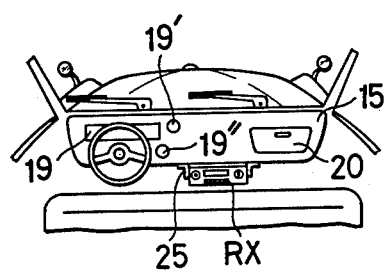
FIG. 5 is a front view showing that the radio receiver of FIG. 1 mounted under the instrument panel in the under-dash mounting manner.
Figure 6:
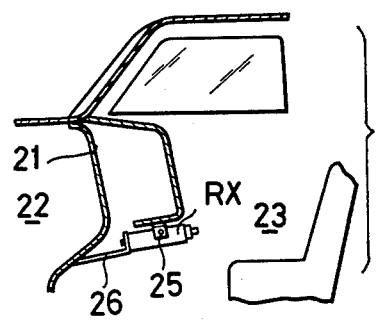
FIG. 6 is a cross-sectional view showing the arrangement similar to FIG. 5.
Figure 7:
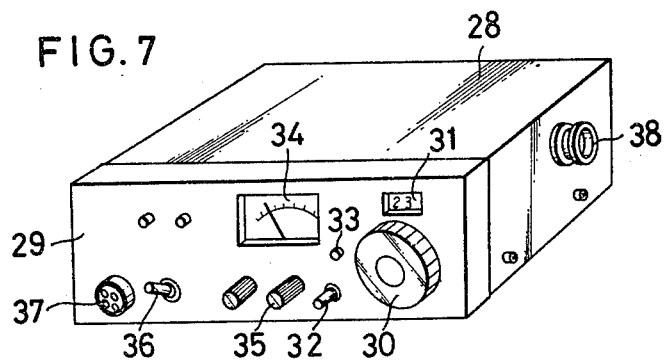
FIG. 7 is a perspective view of a conventional CB transceiver.

Although the channel indicating FIG. 53 is provided on the channel selecting knob 47 in this embodiment, the FIG. 53 may be digitally displayed as shown in FIG. 7. In the conventional radio receiver RX of FIG. 1, the stereo control knob 7 is arranged in place of the channel selecting knob 47 of this embodiment. The stereo control knob 7 may be arranged as a trimmer at a suitable position of the housing 41. A power switch-volume control knob 48 and a tone control knob 49 are arranged in the same manner as in the conventional radio receiver.

Figure 11:
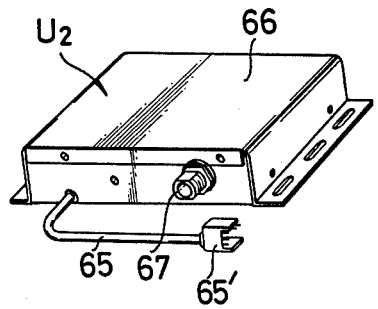
FIG. 11 is a perspective view of a CB transceiver unit used with the disclosed embodiment of this invention.
Figure 12:
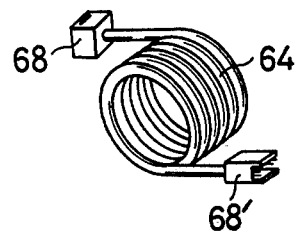
FIG. 12 is a perspective view of an intermediate cable for connecting the CB transceiver control unit with the radio receiver of FIG. 8 to the CB transceiver unit of FIG. 11.

An antenna lead socket 56, speaker connection leads 57,57', and a power supply lead 58 are led out from the back side of the housing 41, in the same manner as in the conventional radio receiver. Moreover, a microphone connection lead 59 and a connecting cable 63 for electrically connecting the CB transceiver control unit $U_1$ with a CB transceiver unit $U_2$ of FIG. 11 are led out from the back side of the housing 41. A microphone unit to be described hereafter is connected to the microphone connection lead 59.

FIG. 11 shows a CB transceiver unit $U_2$ combined with the CB transceiver control unit with the radio receiver $U_1$ of FIG. 8. The unit $U_1$ of FIG. 8 is combined through an intermediate cable 64 shown in FIG. 12 with the unit $U_2$ of FIG. 11. Connectors 68 and 68' are fixed on both ends of the intermediate cable 64. The unit $U_2$ of FIG. 11 is connected through a connecting cable 65 with the intermediate cable 64. A housing 66 of the unit $U_2$ is, for example, about 50mm high, about 170mm wide and about 170mm long. As described hereafter in detail, the housing 66 contains a receiving system including a high frequency amplifier, a frequency converter, an intermediate frequency amplifier, a detecting circuit, a squelch circuit and so on, and a transmitting system including a modulating circuit, a carrier oscillator, and a high frequency power amplifier.

A power amplifier for the speaker does not need to be arranged in the CB transceiver unit $U_2$. A power amplifier (low frequency power amplifier) arranged in the unit $U_1$ may be used also for the CB transceiver. At that case, the power amplifier is changed over alternatively to the radio receiver and the CB transceiver. An antenna socket 67 is arranged on the side wall of the housing 66 of the unit $U_2$.

Next, circuits in the CB transceiver control unit with the radio receiver $U_1$, the microphone unit $U_3$ attached to the unit $U_1$, and the CB transceiver unit $U_2$, will be described with reference to FIGS. 13 and 14.

Figure 13:
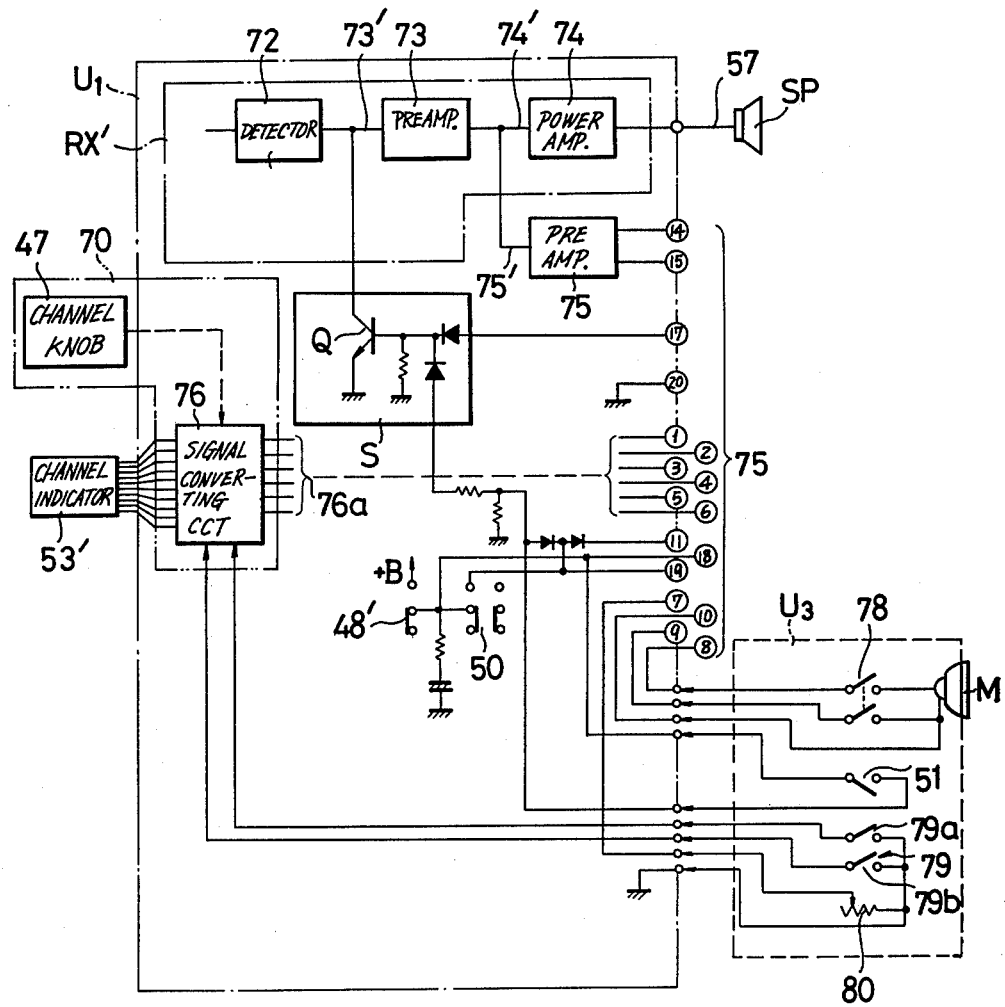
FIG. 13 is a circuit diagram of an electrical circuit in the CB transceiver control unit with the radio receiver of FIG. 8.

In FIG. 13, the reference mark RX' represents, a radio receiving section. A reference numeral 70 represents a channel selecting means including the channel selecting knob 47. And a reference numeral 71 represents terminals of the connector 63' fixed to the connecting cable 63.

The radio receiving section RX' includes a detecting circuit 72, a preamplifier 73 and a power amplifier 74. A speaker SP is connected through the speaker connection lead 57 to the power amplifier 74. An output terminal 75' of a preamplifier 75 for the CB transceiver is connected to an input terminal 74' of the power amplifier 74. As occasion demands, the preamplifier 75 for the CB transceiver may be arranged in the CB transceiver unit $U_2$.

A switching circuit S is connected to an input terminal 73' of the preamplifier 73 for the radio receiver RX'. The input terminal 73' is connected through a switching element Q of the switching circuit S to the ground. The switching element Q turns on upon receiving the output signal of a squelch circuit (not shown) arranged in the receiving system (circuit) of the transceiver unit $U_2$, or upon the depression of the CB transceiver change-over push button 51 shown in FIG. 8. With the depression of the CB transceiver change-over push button 51, a switch 51' in the microphone unit $U_3$ is closed. When the switching element Q turns on, the radio signal from the antenna does not pass through the preamplifier 73, but branches at the input terminal 73' to the ground. Now, the power amplifier 74 and the speaker SP work as one part of the receiving system of the CB transceiver.

FIG. 13 shows the case in which the channel number is digitally displayed at the channel indicating member 53' and changed with the rotation of the channel selecting knob 47. The signal converting circuit 76 is controlled by the channel selecting knob 47. The channel number is displayed at the channel indicating member 53', which may be arranged at the front panel of the unit $U_1$ of FIG. 8 instead of the channel indicating member 53, under control of the output of the signal converting circuit 76. Another output 76a of the signal converting circuit 76 is applied through output terminals ①to⑥of the terminal 71 to a phased Locked Loop circuit PLL arranged in the unit $U_2$.

In FIG. 13, a reference numeral 48' represents a power supply switch which is interlocked with the power switch-volume control knob 48 shown in FIG. 8. The stand-by switch 50 in FIG. 13 corresponds to the stand-by push button 50 in FIG. 8.

A microphone M, a press-to-talk switch 78, and the CB transceiver change-over switch 51' are arranged in the microphone unit $U_3$. The CB transceiver change-over switch 51' corresponds to the CB transceiver change-over push button 51 in FIG. 8. When the switch 51' is closed at one stationary contact 51'a, the switching circuit S turns on, and so the CB transceiver is selectively operated. A reference numeral 79 represents a channel selection remote control switch to control the signal converting circuit 76, and works as a dual speed automatic channel selection system. Depressing the switch 79 advances the channel selection one channel. If the switch 79 is held down, the channels are rapidly scanned. The system operates in both UP and DOWN functions. One switch 79a of the switch 79 is for the UP function, while another switch 79b of the switch 79 is for the DOWN function. Moreover, a squelch volume 80 is arranged in the microphone unit $U_3$.

Figure 14:
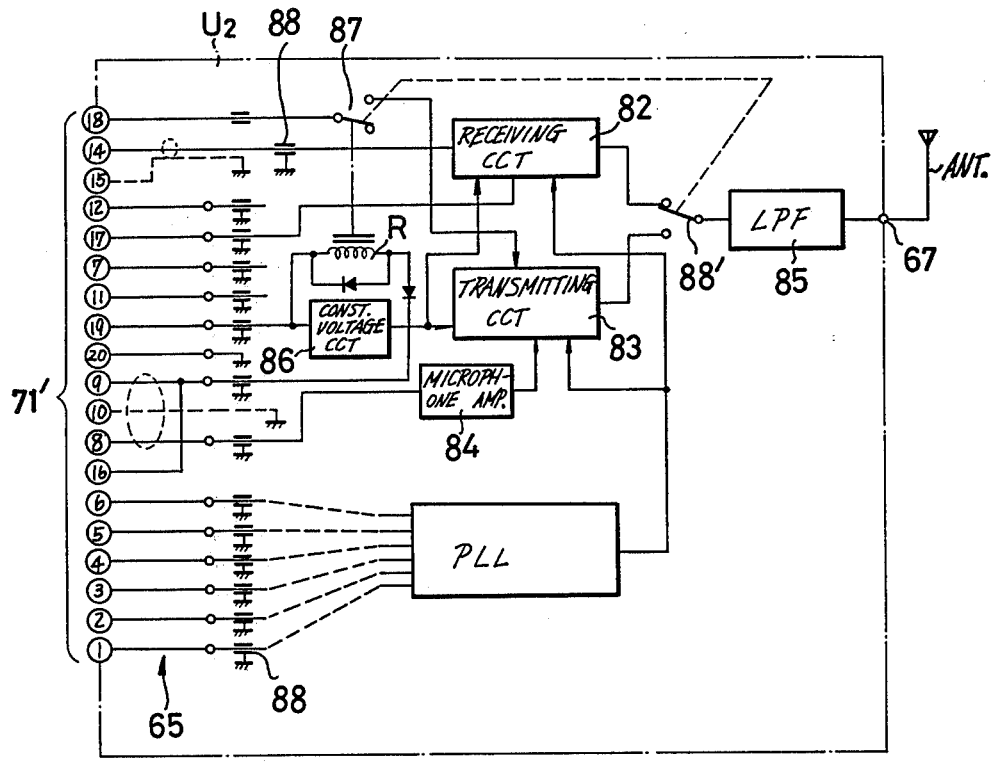
FIG. 14 is a circuit diagram of an electrical circuit in the CB transceiver unit of FIG. 11.

FIG. 14 shows the CB transceiver unit $U_2$. Connection terminals $71'$ (①,②,③...) are arranged in the connector $65'$ of the connection cable 65. The terminals ①②③... are connected through the intermediate cable 64 to the corresponding terminals ①,②,③... of the CB transceiver control unit $U_1$ with the radio receiver RX' of FIG. 13.

A receiving circuit 82, a transmitting circuit 83, a microphone amplifier 84 and a low pass filter 85 for eliminating unwanted signals are arranged in the CB transceiver unit $U_2$. An antenna ANT is connected to the antenna socket 67. The phased locked loop PLL is connected to the receiving circuit 82 and to the transmitting circuit 83. A constant voltage circuit 86 is connected to the terminal ⑲. A relay R is actuated with the operation of the press-to-talk switch 78 arranged in the microphone unit $U_3$, to change over a switch 87 to the transmitting circuit 83. The switch 87 is ganged with a switch $88'$ connected to the low pass filter 85.

Feedthrough capacitors 88 are arranged on the end of the connection cable 65 in the unit $U_2$, to by-pass unwanted signals.

Next, the manners in which the units $U_1$ and $U_2$ are mounted in the automobile will be described with reference to FIG. 15 (A), (B), (C). In all of the different types of mounting, the CB transceiver control unit with the radio receiver $U_1$ is mounted in the instrument panel 15, with the in-dash type of mounting.

Figure 15A:
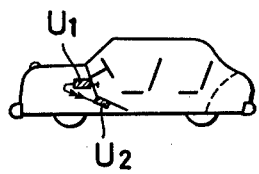
FIG. 15 (A), (B), (C) is a schematic view showing the manners in which the CB transceiver control unit of the radio receiver of FIG. 8, and the CB transceiver unit of FIG. 11 are mounted in the automobile.
Figure 15B:
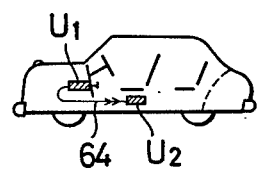
Figure 15C:
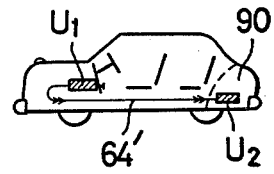

In the manner of FIG. 15 (A), the CB transceiver unit $U_2$ is mounted near the instrument panel 15 in the area of the driver's seat. In that case, the units $U_1$ and $U_2$ are directly connected through the respective connection cables 63 and 65 to each other, without using the intermediate cable 64.

In the manner of FIG. 15 (B), the CB transceiver unit $U_2$ is mounted under the driver's seat. In that case, the units $U_1$ and $U_2$ are connected through the intermediate cable 64, and the respective connection cables 63 and 65, to each other.

In the manner of FIG. 15 (C), the CB transceiver unit $U_2$ is mounted in the trunk room 90. In that case, the units $U_1$ and $U_2$ are connected to each other through a longer intermediate cable $64'$ and the respective connection cables 63 and 65.

Although there have been described three manners of mounting units $U_1$ and $U_2$, these mounting manner is not limited to the three manners. The CB transceiver unit $U_2$ can be mounted in any desired location of the automobile.

Next, the operations of the units $U_1$ and $U_2$ will be described.

A desired band is selected with the AM/FM change-over push button 43. And electric power is supplied with the power switch-volume control knob 48. A desired channel is selected with the channel selecting push button 43 and the tuning knob 46. The volume control knob 48 and the tone control knob 49 are adjusted to a desired condition. The radio signals are received.

On the other hand, a desired channel for the CB transceiver is selected with the channel selecting knob 47. The stand-by push button 50 is depressed. In that condition, when the CB signals of the desired channel are received, the switching circuit S operates to automatically change over the radio receiver RX' to the CB transceiver circuit. Thus, signals can be transmitted and received between the operator and the transmitter. The press-to-talk switch 78 in the microphone unit $U_3$ is operated to transmit the signals from the operator.

When the CB transceiver change-over push button 51 is depressed, or when the change-over switch $51'$ is closed at the stationary contact $51'a$ in FIG. 13, the CB transceiver is selectively operated.

According to this embodiment, the operating members for the radio receiver RX' and the CB transceiver, to be actuated by the driver, such as the AM/FM change-over push button 43, the channel selecting push buttons 44, the channel selecting knob 47 and the stand-by push button 50, and the indicating members such as the dial plate 45 and the FIG. 53 for the CB channel, are arranged in the instrument panel 15 near the operator. Accordingly, the operator can easily, accurately and safely operate both the radio receiver and the CB transceiver. The safety of the drive is assured.

FIG. 16 shows a CB transceiver control unit with a radio receiver according to another embodiment of this invention. Parts which correspond to the same parts in FIG. 8 are denoted by the same reference numerals. The radio receiver is of the AM/FM multiplex 8-track tape player type. The channel selecting knob 47 and the channel indicating member $53'$ are assembled with the radio receiver. A reference numeral 92 represents a tape slot door behind which there is a holder for a tape cartridge of the 4-channel 8-track type. The CB transceiver control unit with the radio receiver, of FIG. 16 is mounted in the automobile, the same manner as in the first embodiment. In this embodiment, stereo sound can be reproduced from the magnetic tape. Of course, the radio signals can be received, and the CB signals can be transmitted and received as in the first embodiment.

FIG. 17 shows a CB transceiver control unit with a radio receiver according to a third embodiment of this invention. Parts which correspond to the same parts in FIG. 8 are denoted by the same reference numerals. The radio receiver is of the AM/FM multiplex cassette type. The channel selecting knob 47 and the channel indicating member 53 are assembled with the radio receiver. A reference numeral 93 represents a tape slot door behind which there is a holder for a tape cassette. The CB transceiver control unit with the radio receiver, of FIG. 17 is mounted in the automobile, in the same manner as in the first embodiment. The radio signals can be received, and the CB signals can be transmitted and received. Moreover, the reproduced sound from the cassette tape can be played.

FIG. 18 shows a CB transceiver control unit $U_4$ according to a fourth embodiment of this invention. In this embodiment, the operating members for the CB transceiver are not assembled into the radio receiver, but are separated from the radio receiver.

In the unit $U_4$, a housing 96 is, for example, about 45 mm high, about 100 mm wide and about 90 mm long. The housing 96 is small-sized. Accordingly, the unit $U_4$ can be mounted near the operator, for example, at the steering wheel shaft of the automobile, without reducing the safety of the operator.

A squelch control knob 97, a volume control knob 98, and a microphone socket 99 are arranged in the front panel of the housing 96. A power supply lead 100 and a connection cable 101 for connecting the unit $U_4$ with the CB transceiver unit $U_2$ are led out from the back panel of the housing 96. When the CB transceiver control unit $U_4$ is used with the CB transceiver, the radio receiver can be mounted at the instrument panel in the automobile, in the in-dash mounting manner, without modification. Substantially the same effect as in the first embodiment can be obtained.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirits of the invention as defined in the appended claims.

What is claimed is:

1. A vehicular communication system, comprising:
   a communication radio transceiver including transmitter circuitry responsive to channel selection signals for transmitting radio signals on selected channels determined by the channel selection signals, and receiver circuitry responsive to the channel selection signals for receiving and detecting radio signals on selected channels determined by the channel selection signals, said communication transceiver being mounted in use at a position remote from a vehicle operator;
   a broadcast band radio receiver having an audio amplifier output circuit for amplifying detected broadcast band radio signals, said broadcast band radio receiver being mounted in use at a position proximate a vehicle operator and remote from said communication radio transceiver;
   a control unit including means for applying the detected radio signals from said communication radio transceiver to said audio amplifier output circuit of said broadcast band radio receiver to be amplified, electronic switching circuit means operable for inhibiting said audio amplifier output circuit of said broadcast band radio receiver from amplifying detected broadcast band radio signals so as to amplify the detected signals from said communication radio transceiver without interference from detected broadcast band radio signals, channel selecting means for developing the channel selecting signals for selecting the channels on which said communication radio transceiver operates, and channel indicating means for indicating the channel of said communication radio transceiver selected by the channel selection signals, said control unit being mounted in use at a position proximate a vehicle operator and remote from said communication radio transceiver; and
   a connecting cable for connecting said control unit and said communication radio transceiver for applyinng channel selection signals from said control unit to said communication radio transceiver and for applying the detected signals from said communication radio transceiver to said control unit.

2. A vehicular communication system according to claim 1; wherein said audio amplifier output circuit of said broadcast band radio receiver is comprised of a preamplifier circuit and an amplifier circuit connected in series; wherein said means for applying the detected radio signals from said communications radio transceiver to said audio amplifier output circuit of said broadcast band radio receiver is comprised of a second audio preamplifier circuit receptive of the detected signals from said communication radio transceiver and connected for applying detected signals amplified by the second audio preamplifier to said amplifier circuit of said audio amplifier output circuit; and wherein said means operable for inhibiting said audio amplifier output circuit is comprised of an electronic switching circuit having a semiconductor element between said preamplifier circuit of said audio amplifier output circuit and ground, and means for rendering said semiconductor element conductive and non-conductive for controlling application of detected broadcast band radio signals to said preamplifier circuit of said audio amplifier output circuit.

3. A vehicular communication system according to claim 1 further comprising a housing; and wherein said broadcast band radio receiver and said control unit are both mounted in said housing.

* * * * *